United States Patent
Fujio

(10) Patent No.: US 11,021,334 B2
(45) Date of Patent: Jun. 1, 2021

(54) CONVEYING AND SORTING APPARATUS

(71) Applicant: Daifuku Co., Ltd., Osaka (JP)

(72) Inventor: Yoshihiko Fujio, Shiga (JP)

(73) Assignee: Daifuku Co., Ltd.

( * ) Notice: Subject to any disclaimer, the term of this patent is extended or adjusted under 35 U.S.C. 154(b) by 0 days.

(21) Appl. No.: 16/939,930

(22) Filed: Jul. 27, 2020

(65) Prior Publication Data

US 2020/0354162 A1    Nov. 12, 2020

Related U.S. Application Data

(63) Continuation of application No. PCT/JP2019/010354, filed on Mar. 13, 2019.

(30) Foreign Application Priority Data

Apr. 27, 2018   (JP) .............................. JP2018-086869

(51) Int. Cl.
*B65G 47/94* (2006.01)
*B65G 23/34* (2006.01)
*B65G 47/46* (2006.01)

(52) U.S. Cl.
CPC ........... *B65G 47/945* (2013.01); *B65G 23/34* (2013.01); *B65G 47/46* (2013.01)

(58) Field of Classification Search
CPC ........ B65G 23/32; B65G 23/34; B65G 47/94; B65G 47/945; B65G 47/962; B65G 47/38; B65G 47/646; B65G 47/46
See application file for complete search history.

(56) References Cited

U.S. PATENT DOCUMENTS

| | | | | |
|---|---|---|---|---|
| 5,085,310 | A * | 2/1992 | Scata | B07C 5/362 |
| | | | | 198/369.3 |
| 5,474,415 | A * | 12/1995 | Becker | B65G 47/962 |
| | | | | 198/349 |
| 9,878,852 | B2 * | 1/2018 | Sorensen | B65G 47/945 |
| 10,494,193 | B2 * | 12/2019 | Sorensen | B65G 47/962 |

FOREIGN PATENT DOCUMENTS

| | | |
|---|---|---|
| JP | 1973078591 U | 9/1973 |
| JP | 10087060 A | 4/1998 |
| JP | 2010158645 A | 7/2010 |
| JP | 2015501770 A | 1/2015 |
| JP | 2016526517 A | 9/2016 |
| WO | 2013075714 A1 | 5/2013 |

* cited by examiner

*Primary Examiner* — William R Harp
(74) *Attorney, Agent, or Firm* — St. Onge Steward Johnston & Reens LLC

(57) ABSTRACT

A conveying and sorting apparatus has tilting motors which switch tilting conveyor units which are supported so as to be able to swing about a support shaft that is parallel with the conveying direction, between a horizontal conveying orientation and a tilted orientation; and a conveyor driving motor which drives the conveying conveyors and that are provided to the tilting conveyor units. The support shaft has a single interlocking transmission shaft having a length which covers the entire area of the plurality of tilting conveyor units. The conveying conveyors of each tilting conveyor unit are interconnected by the interlocking transmission shaft. One conveyor driving motor is provided for the plurality of tilting conveyor units supported by the interlocking transmission shaft. This single conveyor driving motor drives the conveying conveyors via the interlocking transmission shaft.

3 Claims, 9 Drawing Sheets

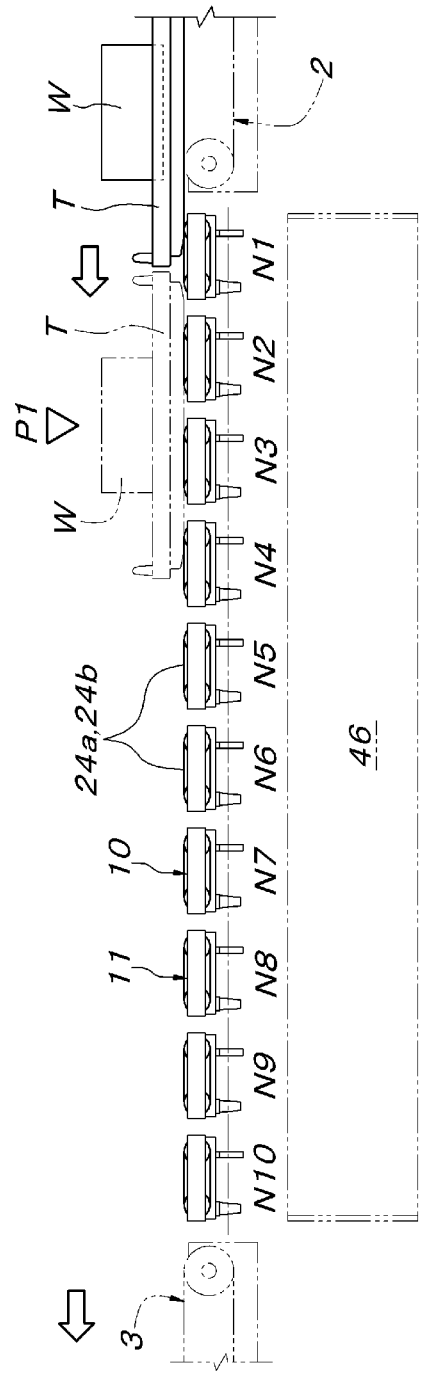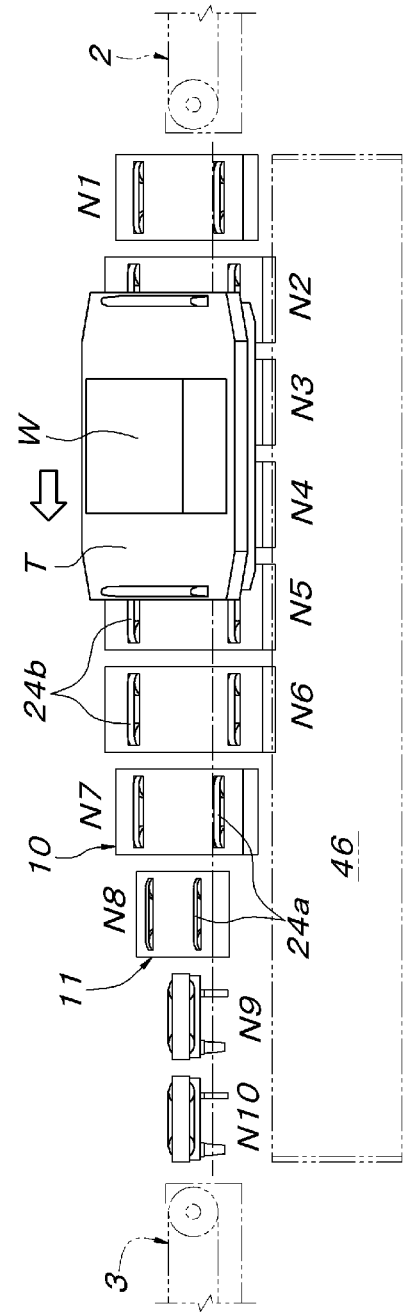

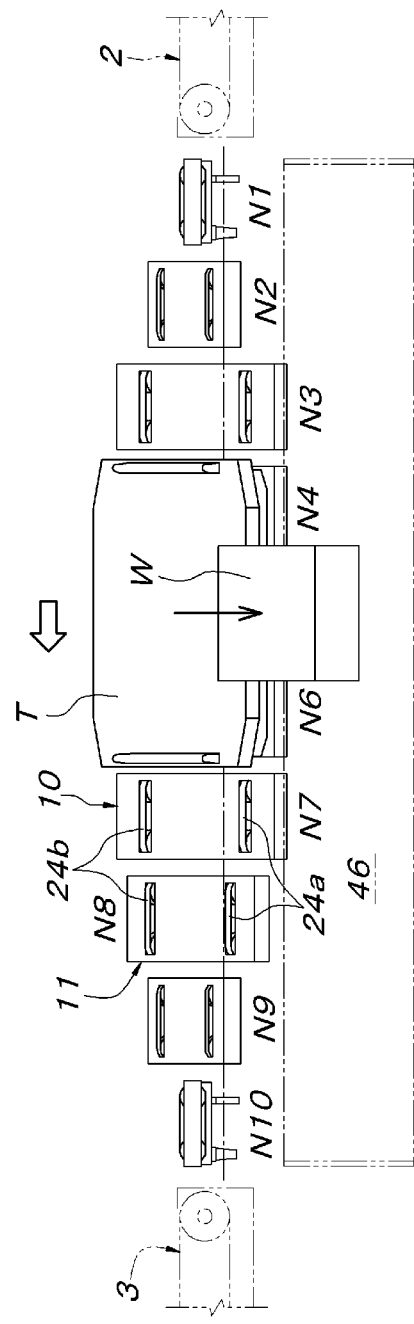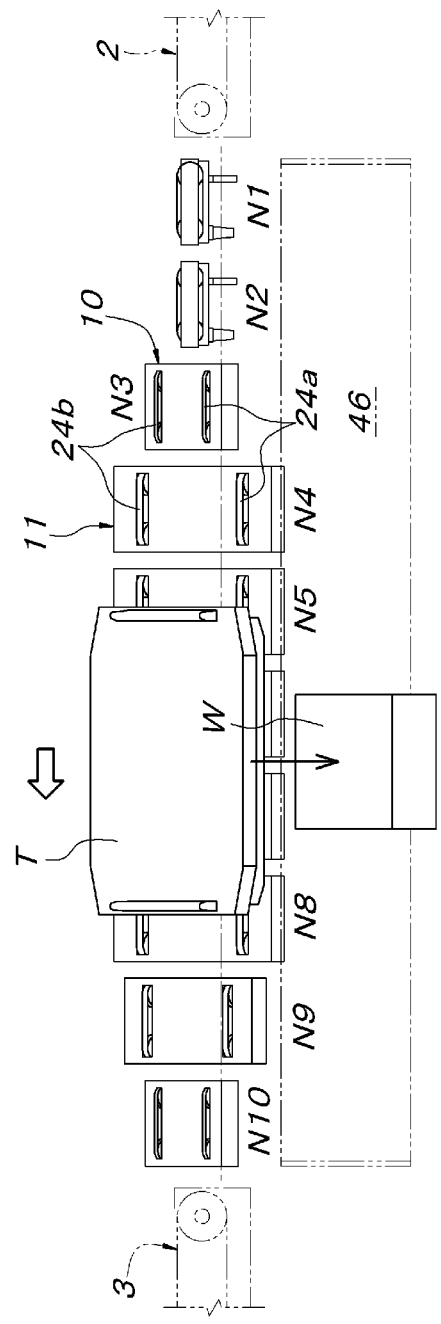

CONVEYING AND SORTING APPARATUS

FIELD OF THE INVENTION

The present invention relates to a conveying and sorting apparatus capable of laterally sliding and sorting a conveyed object by gravity at a sorting position set on a conveying path of the conveyed object.

BACKGROUND OF THE INVENTION

As the conveying and sorting apparatus as described above, as described in Patent Literature 1, there is known a conveyed object conveying and sorting apparatus including a plurality of tilting conveyor units arranged in a row in a conveying direction, each of the tilting conveyor units supported so as to be swingable about a support shaft parallel to the conveying direction of the conveyed object between a horizontal conveying orientation and a tilted orientation for discharging the conveyed object laterally with respect to the conveying direction of the conveyed object by gravity, a conveyor driving motor arranged to drive conveying conveyors for the conveyed object provided to each of the tilting conveyor units, and a tilting motor arranged to switch each of the tilting conveyor units between the horizontal conveying orientation and the tilted orientation.

CITATION LIST

Patent Literature

Patent Literature 1: Japanese Translation of International Application (Kohyo) No. 2015-501770

SUMMARY OF THE INVENTION

Technical Problem

Above-described Patent Literature 1 describes that a tilt actuator for tilting each tilting conveyor unit about an axis parallel to the conveying direction is provided as a means for switching each tilting conveyor unit between the horizontal conveying orientation and the tilted orientation and that friction belts for conveying the conveyed object provided to each tilting conveyor unit are driven by an electric motor attached to the tilting conveyor unit (tilting component). In other words, a configuration is described in which a conveyor driving motor arranged to drive the conveying conveyors provided to the tilting conveyor unit is attached to all of the tilting conveyor units caused to swing between the horizontal conveying orientation and the tilted orientation. In this configuration, not only does it require the same number of conveyor driving motors as the number of tilting conveyor units but also a power feeding system for the conveyor driving motor attached to the tilting conveyor unit that swings requires a flexible power feeder having a length which does not hinder the swinging motion of the tilting conveyor unit or an alternative means, for example, an arc-shaped current-carrying rail concentric with the swinging axis center of the tilting conveyor unit and a power feed contact slidingly contacting the rail, etc., and thus, a problem that the cost becomes extremely high is considered.

Solution to Problem

The present invention proposes a conveying and sorting apparatus capable of solving the conventional problems as described above. Described by giving reference signs in parentheses used in the description of an embodiment described below in order to facilitate understanding the relationship with the embodiment, the conveying and sorting apparatus according to the present invention is a conveyed object conveying and sorting apparatus including a plurality of tilting conveyor units (10, 11) arranged in a row in a conveying direction, each of the tilting conveyor units (10, 11) supported so as to be swingable about a support shaft (7) parallel to the conveying direction of the conveyed object between a horizontal conveying orientation and a tilted orientation for discharging the conveyed object laterally with respect to the conveying direction of the conveyed object by gravity, a conveyor driving motor (20) arranged to drive conveying conveyors (24a, 24b) for the conveyed object provided to each of the tilting conveyor units (10, 11), and a tilting motor (12, 13) arranged to switch each of the tilting conveyor units (10, 11) between the horizontal conveying orientation and the tilted orientation, in which the support shaft (7) is formed of a single interlocking transmission shaft (19) having a length covering an entire area including the plurality of tilting conveyor units (10, 11) (area composed of assemblies 1A to 1E), and the conveying conveyors (24a, 24b) of all of the tilting conveyor units (10, 11) in the area are interlockingly coupled to the interlocking transmission shaft (19), and the one conveyor driving motor (20) is installed for the area, and the one conveyor driving motor (20) drives the conveying conveyors (24a, 24b) of all of the tilting conveyor units (10, 11) in the area via the interlocking transmission shaft (19).

Effects of Invention

According to the configuration of the present invention described above, the conveyors for conveying the conveyed object provided to the plurality of tilting conveyor units can be driven by one conveyor driving motor, and the support shaft that supports each tilting conveyor unit so as to be swingable is also used as the transmission shaft required for the transmission system for the conveying conveyors of each tilting conveyor unit. Thus, the equipment cost can be reduced significantly. Further, as in the conventional case in which the conveyor driving motor for driving the conveying conveyor of each tilting conveyor unit is attached to the tilting conveyor unit that swings, the flexible power feeder having a length which does not hinder the swinging motion of the tilting conveyor unit or an alternative power feeding means composed of the arc-shaped current-carrying rail and the power feed contact slidingly contacting the rail is not required for the power feeding system for the conveyor driving motor. Thus, the cost of the power feeding system can also be reduced and the possibility of a failure of the power feeding system, etc., can also be nearly eliminated.

When the above present invention is carried out, specifically, it can be configured such that a single drive shaft (32) interlockingly coupled to the conveying conveyors (24a, 24b) is provided to each of the tilting conveyor units (10, 11) so as to be arranged above the interlocking transmission shaft (19) in an orientation parallel to the conveying direction of the conveyed object, and the single drive shaft (32) and the interlocking transmission shaft (19) are interlockingly coupled by a winding transmission means (33), and bearings (8a to 9b) for supporting the tilting conveyor unit (10, 11) so as to be swingable about the interlocking transmission shaft (19) are attached to each of the tilting conveyor units (10, 11), and a passive rotating body (38b, 39b) relatively rotatably fitted to the interlocking transmission shaft (19) at a position adjacent to the bearing (8a, 9b) is fixed to the bearing (8a, 9b), and a rotational force of an output shaft (36, 37) of the tilting motor (12, 13) arranged corresponding to each of the tilting conveyor units (10, 11) is transmitted to the tilting conveyor unit (10, 11) via a winding transmission tool (38c, 39c) stretched between a transmission rotating body (38a, 39a) attached to the output shaft (36, 37) and the passive rotating body (38b, 39b). According to this configuration, the bearing on the side of the tilting conveyor unit naturally required for supporting the tilting conveyor unit so as to be swingable about the interlocking transmission shaft is also used as a member for receiving the rotational force of the output shaft of the tilting motor, and then, the number of necessary parts can be reduced to make the entire configuration simple, and the cost can be further reduced.

Further, the plurality of tilting conveyor units (10, 11) is divided into a plurality of assemblies (1A to 1E) with two adjacent tilting conveyor units (10, 11) as one assembly, Two tilting conveyor units (10, 11) are supported by one support shaft (7) whose both end portions are supported by support members (14, 15, 17) via bearings (5, 6) in each of the assemblies (1A to 1E). The support shafts (7) are interlockingly coupled to each other by a joint 18 between two adjacent assemblies (1A to 1E) to form the interlocking transmission shaft (19), One conveyor driving motor (20) is arranged outside the assembly (1E) located at one end. Two tilting motors (12, 13) driving the two tilting conveyor units (10, 11) in each of the assemblies (1A to 1E) can be installed such that the transmission rotating bodies (38a, 39a) are reverse to each other in the front-rear direction at both left and right sides of the interlocking transmission shaft (19) in plan view. According to this configuration, even when a speed reducer equipped with a large and long motor having a large driving capacity is required as the tilting motor for switching the orientation of each tilting conveyor unit, the two tilting motors can be effortlessly incorporated into an area within one assembly by arranging the two tilting motors in a point symmetrical manner in plan view, and the assembly composed of the two tilting conveyor units, the two tilting motors for tilting the both tilting conveyor units, and the one support shaft (a part of the interlocking transmission shaft) interlockingly coupled to the conveying conveyors for the conveyed object of the two tilting conveyor units can be configured compact. Then, by only arranging a plurality of assemblies in series and connecting the support shafts (parts of the interlocking transmission shafts) to each other by a joint and the conveyor driving motor installed at one end is interlockingly coupled to one end of the interlocking transmission shaft, a conveying and sorting apparatus having an overall length of an integral multiple of the tilting conveyor unit can be assembled easily.

BRIEF DESCRIPTION OF THE DRAWINGS

FIG. 7A is a schematic side view showing a first stage of a conveying and sorting operation of the conveying and sorting apparatus, and FIG. 7B is a schematic side view showing a second stage of the same.

FIG. 8A is a schematic side view showing a third stage of the same, and FIG. 8B is a schematic side view showing a fourth stage of the same.

DETAILED DESCRIPTION OF THE INVENTION

Figure 1A:
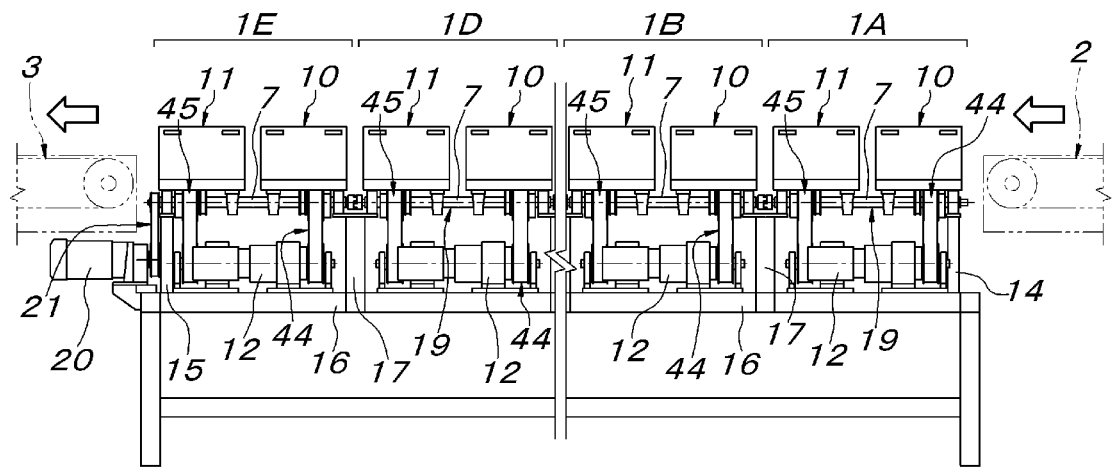
FIG. 1A is a partially omitted side view of a conveying and sorting apparatus.
Figure 1B:
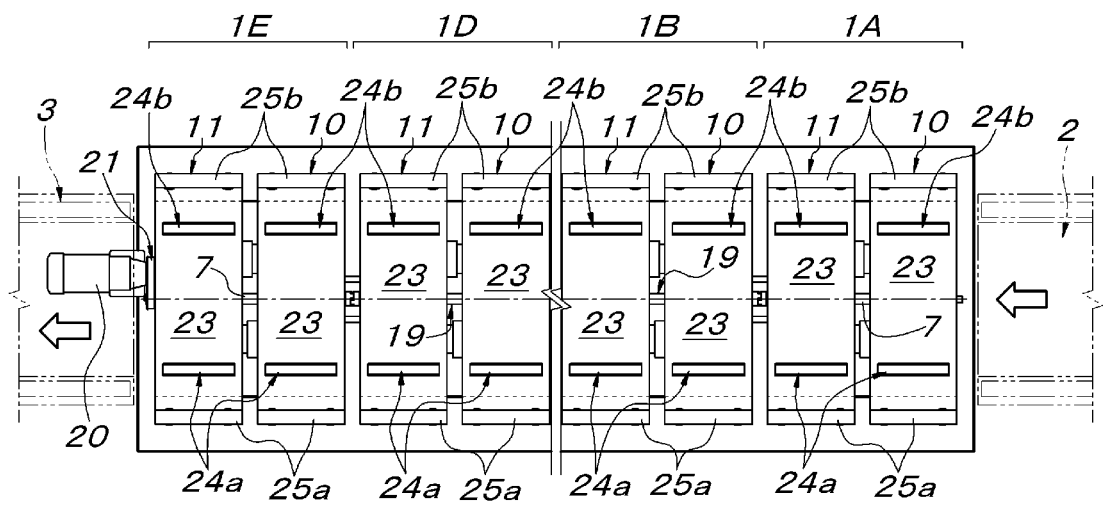
FIG. 1B is a plan view of the same.
Figure 2:
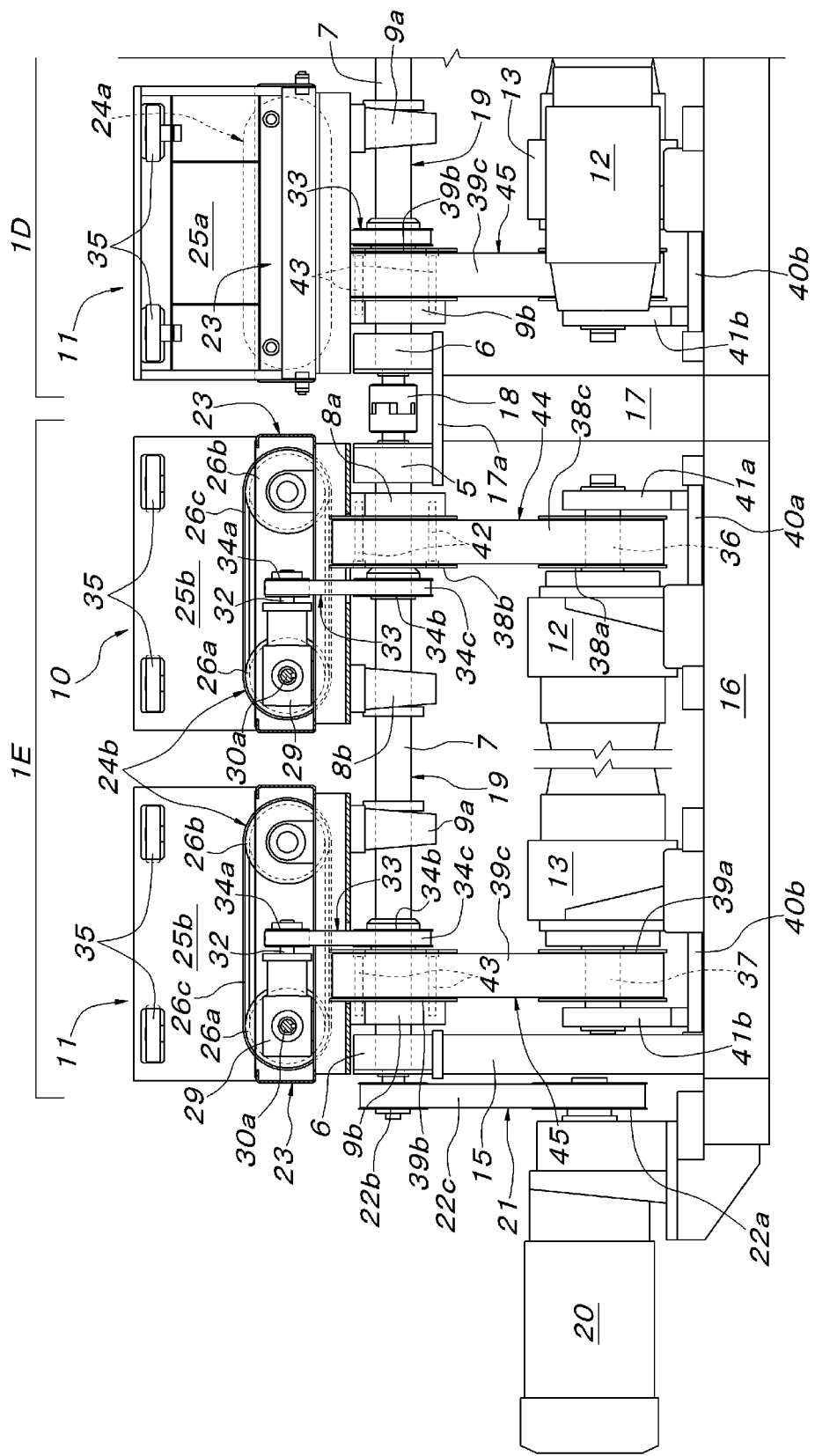
FIG. 2 is a side view of a main part showing an exit side area of the conveying and sorting apparatus.

FIG. 1A and FIG. 1B are a schematic side view and a plan view in which an illustration of a central assembly 1C of five assemblies 1A to 1E forming the conveying and sorting apparatus is omitted. A carry-in conveyor 2 is connected to an assembly 1A at an entrance side end portion, and a carry-out conveyor 3 is connected to an assembly 1E at an exit side end portion. In this embodiment, a sorting area is set at one or a plurality of locations on a conveying path for conveying a tray T loaded with a conveyed object. In this sorting area, the conveying and sorting apparatus according to the present invention is installed. The sorting of the conveyed object in this conveying and sorting apparatus is carried out by tilting the conveyed tray T in one of left and right sorting directions without stopping the movement in the conveying direction, and laterally and downwardly sliding and dropping the conveyed object loaded on the tray T from on top of the tray T by gravity. As a matter of course, the conveyed object can also be conveyed directly without using the tray T and sorted as above.

Hereinafter, a detailed structure of each assembly 1A to 1E is described based on FIG. 2 to FIG. 5. Each assembly 1A to 1E is composed of a support shaft 7 having both ends rotatably supported by a pair of bearings 5, 6 in the conveying direction of the conveyed object, being parallel to the conveying direction of the conveying and sorting apparatus, and horizontally located at a central position in a left-right width direction of the conveyed object conveying and sorting apparatus, a pair of front and rear tilting conveyor units 10, 11 supported by a pair of front and rear bearings 8a, 8b and 9a, 9b on this support shaft 7, respectively, and two tilting motors 12, 13 individually switching the tilting conveyor units 10, 11 between a horizontal conveying orientation and a tilted orientation. The bearings 5, 6 located at both ends in the conveying direction of the conveying and sorting apparatus among the pair of front and rear bearings 5, 6 of each assembly 1A to 1E are each supported above a frame 16 by one columnar support member 14, 15. Two adjacent bearings 5, 6 between two adjacent assemblies are supported on a common columnar support member 17 via a pedestal 17a.

Figure 4:
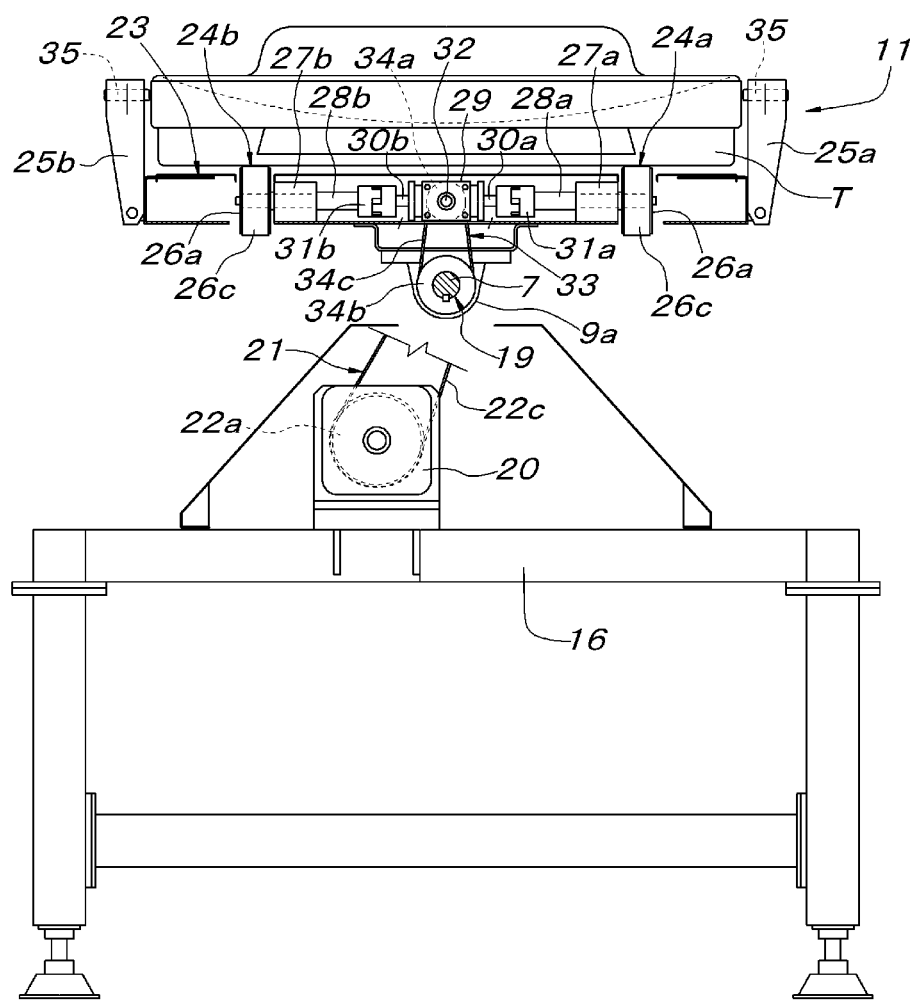
FIG. 4 is a partially cutaway front view showing the exit side of the conveying and sorting apparatus.

Between the two adjacent assemblies of the assemblies 1A to 1E, end portions of the support shafts 7 are concentrically interlockingly coupled to each other by a rotation transmitting joint 18, and a single interlocking transmission shaft 19 continuing over the overall length of the conveying and sorting apparatus, that is, the entire area composed of the assemblies 1A to 1E each including the pair of front and rear tilting conveyor units 10, 11 is formed. As shown in FIG. 1A, FIG. 1B, and FIG. 4, at a free end of the support shaft 7 of the assembly 1E located at the exit side end portion of the conveying and sorting apparatus, one conveyor driving motor 20 supported by the frame 16 outside the assembly 1E is interlockingly coupled by a vertical winding transmission means 21. As the winding transmission means 21, a belt transmission means composed of a transmission-side pulley 22a, a driven-side pulley 22b, and an endless belt 22c stretched between both pulleys 22a, 22b is illustrated. However, the winding transmission means may be a winding transmission means using a chain.

Each tilting conveyor unit 10, 11 has the same structure and is composed of a rectangular structure 23 being horizontally long in plan view, a pair of left and right belt conveyors 24a, 24b for conveying the conveyed object provided to the rectangular structure 23, and side guides 25a, 25b attached along both left and right ends of the rectangular structure 23. The pair of left and right belt conveyors 24a, 24b are formed by stretching an endless belt 26c between a driving pulley 26a and a driven pulley 26b, and installed so that an upper conveying path portion of the endless belt 26c is exposed on an upper surface of the rectangular structure 23. A pair of left and right driving pulleys 26a located concentrically with each other are attached to outer end portions of a pair of left and right rotary shafts 28a, 28b supported in a left-right horizontal orientation by bearings 27a, 27b. Both rotary shafts 28a, 28b are interlockingly coupled, via rotation transmitting joints 31a, 31b, to output shafts 30a, 30b concentrically protruding to both left and right sides from a gear box 29 installed at a central position in the left-right width direction in the rectangular structure 23.

The gear box 29 includes a drive shaft 32 protruding rearward at the central position in the left-right width direction in the rectangular structure 23 and is configured such that both output shafts 30a, 30b are interlocked and rotated in the same direction at the same speed by the rotation of the drive shaft 32. The drive shaft 32 is interlockingly coupled to the interlocking transmission shaft 19 (the support shaft 7 of each assembly 1A to 1E) located directly below the drive shaft 32 by a winding transmission means 33. As the winding transmission means 33, a belt transmission means composed of a transmission-side pulley 34a, a driven-side pulley 34b, and an endless belt 34c stretched between both pulleys 34a, 34b is illustrated. However, the winding transmission means 33 may be a winding transmission means using a chain.

With the above configuration, by operating the one conveyor driving motor 20 installed at the exit side of the conveying and sorting apparatus, the pairs of left and right belt conveyors 24a, 24b provided to the pairs of front and rear tilting conveyor units 10, 11 of all of the assemblies 1A to 1E can be rotationally driven via the winding transmission means 33 and the gear boxes 29 from the interlocking transmission shaft 19 (the support shaft 7 of each assembly 1A to 1E) such that the tray T supported on the belt conveyors 24a, 24b is conveyed from the entrance side to the exit side of the conveying and sorting apparatus at a predetermined speed. In the tray T at this time, the conveying path is regulated at both left and right sides of the tray T by the side guides 25a, 25b erected on both left and right sides of each tilting conveyor unit 10, 11. Guide rollers 35 abutting and rolling on both left and right side surfaces of the tray T are pivotally supported at both front and rear end portions in the conveying direction of the side guides 25a, 25b.

Figure 3:
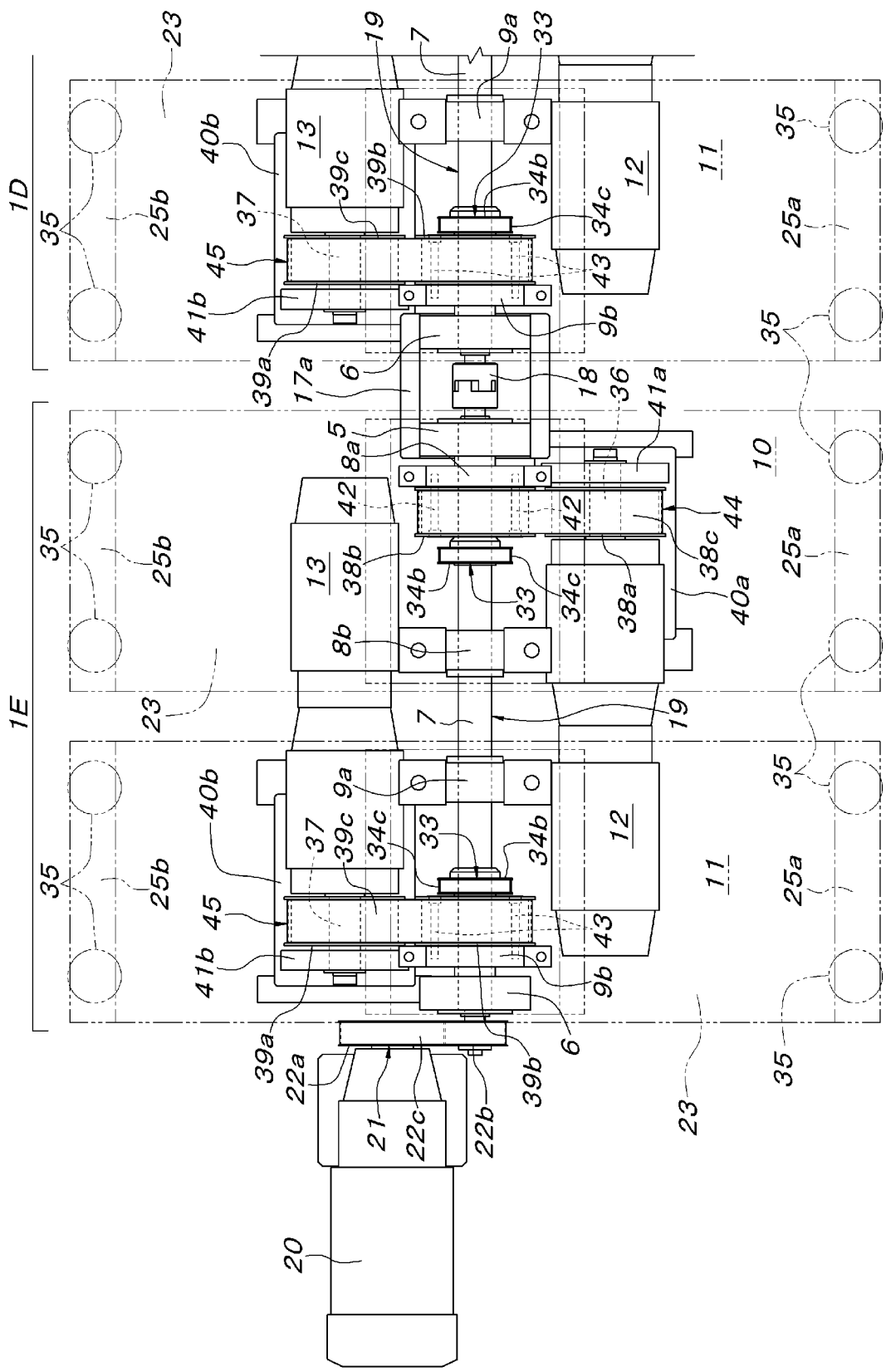
FIG. 3 is a plan view of the main part showing the exit side area of the conveying and sorting apparatus.

The pair of front and rear tilting conveyor units 10, 11 provided to the assemblies 1A to 1E are supported by the interlocking transmission shaft 19 (the support shaft 7 of each assembly 1A to 1E) via the pair of front and rear bearings 8a to 9b, respectively, so as to be tiltable in a direction along which both left and right end portions vertically move. In order to switch the tilting conveyor unit 10, 11 between the horizontal conveying orientation (see FIG. 5) supporting and conveying the tray T and the tilted orientation tilted about the support shaft 7, for example, about 45 degrees, in one of the left and right directions as shown in FIG. 6, the tilting motor 12, 13 is interlockingly coupled for every tilting conveyor unit 10, 11. For both tilting motors 12, 13, a speed reducer equipped with a large servomotor having an overall length in the axial center direction longer than the lateral width in the conveying direction of one tilting conveyor unit 10/11 and having a large driving torque is used. Thus, as shown in FIG. 3, the tilting motors 12, 13 are installed on the frame 16 so that the front and rear are reverse to each other at both left and right sides of the support shaft 7 in plan view and so that respective axial center directions become parallel to the support shaft 7.

More specifically, an output shaft 36, 37 of each tilting motor 12, 13 is attached with a transmission side timing belt pulley 38a, 39a. A free end portion of the output shaft 36, 37 protruding from the transmission side timing belt pulley 38a, 39a is supported by a bearing 41a, 41b attached on a mounting plate 40a, 40b supporting each tilting motor 12, 13. Thereby, the output shaft 36, 37 is made into a doubly supported structure. On the other hand, inside the bearings 5, 6 supporting both ends of the support shaft 7 of each assembly 1A to 1E, bearings 8a, 9b located on the outer side among the pair of front and rear bearings 8a to 9b for tiltably supporting each tilting conveyor unit 10, 11 by the support shaft 7 are adjacent. Further inside the bearings 8a, 9b, driven side timing belt pulleys 38b, 39b paired with the transmission side timing belt pulleys 38a, 39a are loosely fitted to the support shaft 7 so as to be relatively rotatable. These driven side timing belt pulleys 38b, 39b and the bearings 8a, 9b adjacent on the outer side are linked and integrated by a circumferential plurality of linking bolts 42, 43. Timing belts 38c, 39c serving as winding transmission tools are stretched around the transmission side timing belt pulleys 38a, 39a, and driven side timing belt pulleys 38b, 39b, and then winding transmission means 44, 45 using timing belts are thus configured. In other words, two tilting motors 12, 13 in an orientation in which the axial center direction is parallel to the support shaft 7 are installed on the frame 16 in a point symmetrical manner with respect to a central point in the length direction of the support shaft 7 at positions where the winding transmission means 44, 45 can be configured as above.

The mounting plate 40a, 40b supporting each tilting motor 12, 13 and the bearing 41a, 41b is mounted on the frame 16 so as to be positionally adjustable in the left-right lateral direction, and it is configured such that the tension adjustment of the timing belt 38c, 39c of the winding transmission means 44, 45 can be performed. The transmission-side pulley 34b of the winding transmission means 33 for transmitting the rotation of the interlocking transmission shaft 19 (the support shaft 7 of each assembly 1A to 1E) to the belt conveyors 24a, 24b of the tilting conveyor unit 10, 11 is attached to the support shaft 7 at a position adjacent to the inside of the driven side timing belt pulleys 38b, 39b of the winding transmission means 44, 45, as shown in FIG. 3.

An example of a method of using the conveying and sorting apparatus configured as above will be described. As described above, the pairs of left and right belt conveyors 24a, 24b of the pair of front and rear tilting conveyor units 10, 11 provided to each assembly 1A to 1E are such that, by operating the one conveyor driving motor 20, its rotational force is transmitted to the driving pulleys 26a of the belt conveyors 24a, 24b via the winding transmission means 21 and the interlocking transmission shaft 19, and the winding transmission means 33, gear boxes 29, and rotary shafts 28a, 28b respectively corresponding to the tilting conveyor units 10, 11 and the endless belts 26c enter an operating state of rotating in a predetermined direction at a predetermined speed.

Figure 5:
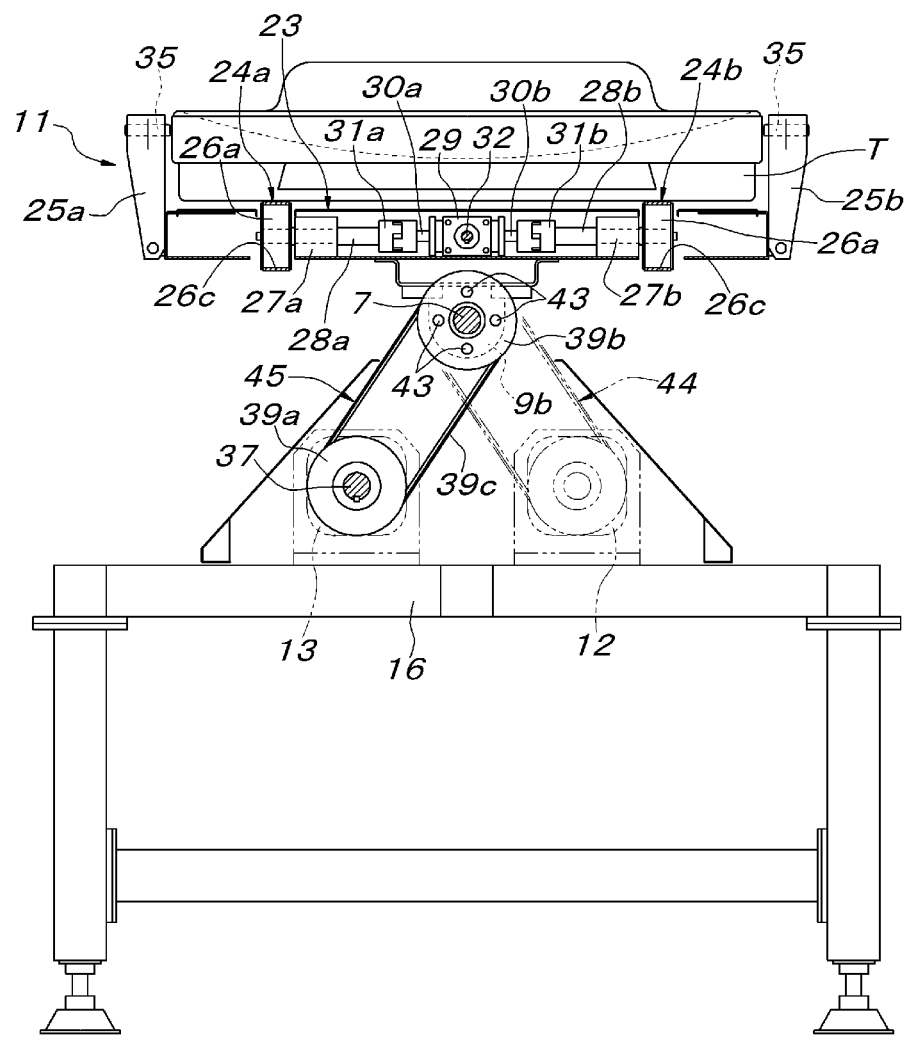
FIG. 5 is a longitudinal sectional rear view showing each assembly forming the conveying and sorting apparatus.
Figure 6:
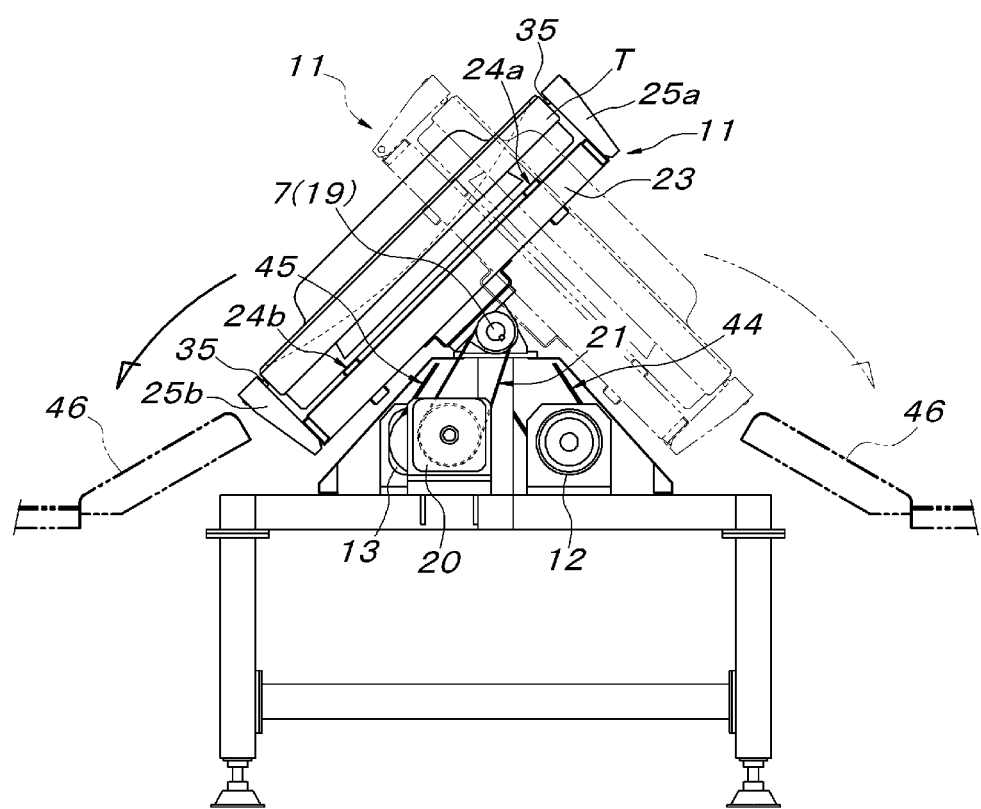
FIG. 6 is a front view showing a sorting operation of a tilting conveyor unit.

On the other hand, the tilting motors 12, 13 are stopped with the tilting conveyor units 10, 11 of all of the assemblies 1A to 1E being in the horizontal conveying orientation as shown in FIG. 5, so that the tilting conveyor units 10, 11 are held in the horizontal conveying orientation by the function of the tilting motors 12, 13 and do not swing about the support shaft 7/the interlocking transmission shaft 19 by gravity. Accordingly, with the tilting conveyor units 10, 11 of all of the assemblies 1A to 1E held in the horizontal conveying orientation, the conveyor driving motor 20 is operated as above to interlockingly rotationally drive the belt conveyors 24a, 24b in a predetermined conveying direction, and then the tray T loaded with the conveyed object sent in from the carry-in conveyor 2 shown in FIG. 1A and FIG. 1B can be conveyed toward the carry-out conveyor 3 at a constant speed and sent out onto the carry-out conveyor 3.

When a specific tilting conveyor unit 10, 11 is switched from the horizontal conveying orientation to the tilted orientation for sorting in a tray conveying state in which the belt conveyors 24a, 24b of the tilting conveyor units 10, 11 of all of the assemblies 1A to 1E are operated as above, the tilting motor 12/13 of the tilting conveyor unit 10/11 to be switched to the tilted orientation is operated and the rotation of its output shaft 36/37 is transmitted to the rectangular structure 23 of the target tilting conveyor unit 10/11 through the transmission side timing belt pulley 38a/39a, the timing belt 38c/39c, and the driven side timing belt pulley 38b/39b of the winding transmission means 44/45 and via the bearing 8a/9b linked and integrated by the linking bolts 42/43. Thereby, the target tilting conveyor unit 10/11 can be tilted about the support shaft 7 (the interlocking transmission shaft 19) in a predetermined direction by a rotation angle of the driven side timing belt pulley 38b/39b. When the tilting conveyor unit 10/11 in the tilted orientation is returned to the original horizontal conveying orientation, the tilting motor 12/13 of the tilting conveyor unit 10/11 is reversely rotated by the rotation angle at the time of tilting operation, and the tilting conveyor unit 10/11 can be returned from the tilted orientation to the original horizontal conveying orientation.

Hereinafter, the sorting operation will be described specifically. When the conveyed object loaded on the tray T sent from the carry-in conveyor 2 is the target to be sorted at a certain place of the conveying and sorting apparatus, the conveying and sorting apparatus configured as above has only to be operated according to procedural steps listed below based on FIG. 7A to FIG. 9B. The conveying path of the conveying and sorting apparatus according to the present embodiment is composed of a total of ten tilting conveyor units 10, 11 forming five assemblies 1A to 1E. In the following description, all of the tilting conveyor units 10, 11 are described by assigning numbers N1 to N10 from the entrance side.

(1) As shown in FIG. 7A, a tray T loaded with a conveyed object W of the sorting target is sent from the carry-in conveyor 2 onto the conveying path of the conveying and sorting apparatus. This tray T has a length in the conveying direction supported across a plurality (three in the illustrated example) of tilting conveyor units 10, 11, and the lateral width is a width that the tray T is fitted in between the side guides 25a, 25b at both left and right sides of each tilting conveyor unit 10, 11 with an appropriate allowance. The tray T has a load placing surface Ts being a recessed arc surface with respect to the left-right width direction orthogonal to the conveying direction, as shown by a dotted line in FIG. 4 to FIG. 6, The conveyed object W is stably held on the load placing surface Ts at the time of conveyance in the normal horizontal conveying orientation.

(2) When the above-described tray T reaches a sorting operation starting position P1 set on the conveying path of the conveying and sorting apparatus, as shown in FIG. 7B, all of the tilting conveyor units N1 to N6 in an area supporting the tray T and an area extended to the conveying direction side appropriately to the conveying speed are simultaneously switched from the horizontal conveying orientation to the tilted orientation for sorting (an orientation tilted 45 degrees to the left in the figure) by the tilting motors 12, 13. Thereafter, each of the tilting conveyor units N7 to N10 on the conveying direction side following the tilting conveyor unit N6 is also sequentially switched to the tilted orientation while the timing is delayed for a given length of time. The tray T supported by the tilting conveyor units 10, 11 switched to the tilted orientation is received by the guide rollers 35 of the side guides 25a on the lower side of the tilt, and is conveyed continuously keeping the tilted orientation while rolling the guide rollers 35.

(3) By the above-described operation, as shown in FIG. 8A and FIG. 8B, the tray T is switched to the tilted orientation integrally with the tilting conveyor units 10, 11 while moving in the conveying direction from the point in time of passing the sorting operation starting position P1, and thereafter the tray T continues to move in the conveying direction while keeping the tilted orientation. Thus, while conveyed integrally with the tray T, the conveyed object W on the tray T slides on the load placing surface Ts of the tray T toward the lower side of the tilt by gravity due to the tray T shifted to the tilted orientation, and is ejected from on top of the tray T to the side of the conveying path. Thus, a chute 46 taking over the conveyed object W sliding laterally from the tray T can be juxtaposed on the ejection side of the conveyed object W out of left and right sides of the conveying and sorting apparatus as shown by a virtual line in FIG. 6 to FIG. 9.

Figure 9A:
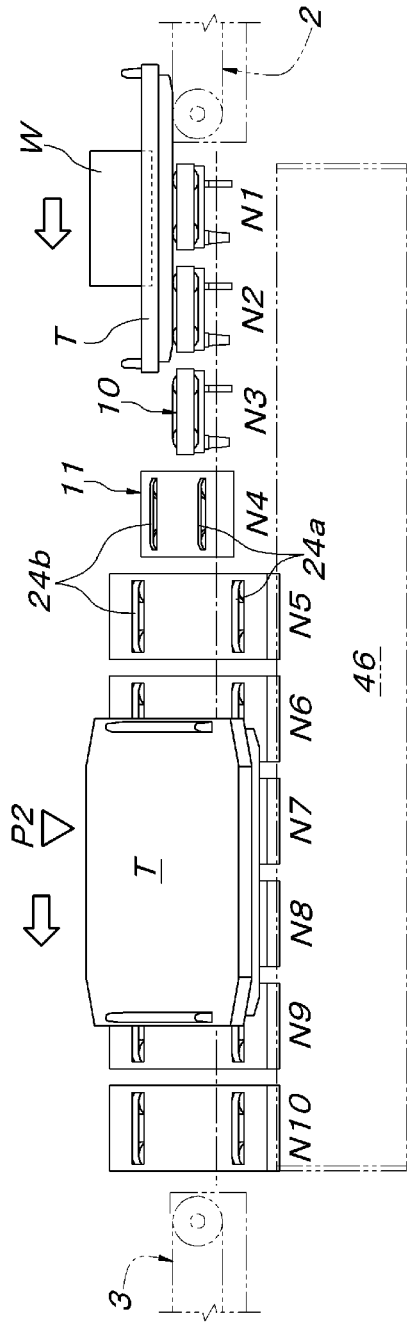
FIG. 9A is a schematic side view showing a fifth stage of the same.
Figure 9B:
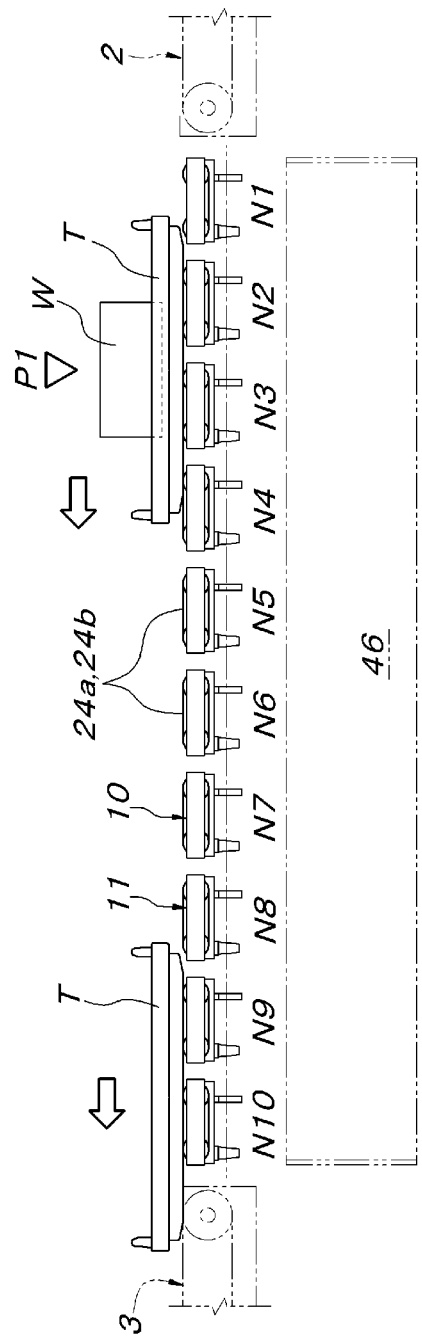
FIG. 9B is a schematic side view showing a sixth stage of the same.

(4) As described above, prior to the tray T being conveyed in the tilted orientation, each tilting conveyor unit 10, 11 on the conveying direction side is sequentially switched to the tilted orientation. Thus, as shown in FIG. 9A, the tray T is continuously conveyed while keeping the tilted orientation, and the ejection of the conveyed object W is reliably completed by the time the tray T passes a sorting operation completion position P2. Thus, all of the tilting conveyor units N6 to N10 in the tilted orientation located in the area supporting the tray T and on the conveying direction side farther than this area are simultaneously returned from the tilted orientation to the original horizontal conveying orientation at the point in time at which the tray T reaches the sorting operation completion position P2. Thereby, as shown in FIG. 9B, the tray T emptied can be sent out onto the carry-out conveyor 3 with the tray T returned to the horizontal conveying orientation.

(5) As shown in FIG. 7B to FIG. 9A, each tilting conveyor unit N1 to N5 sent out relatively rearward with respect to the tray T conveyed in a state of being switched to the tilted orientation is returned from the tilted orientation to the original horizontal conveying orientation sequentially from the side closer to the carry-in conveyor 2. Thereby, as shown in FIG. 9A and FIG. 9B, each tilting conveyor unit N1 to N5 can receive a subsequent tray T loaded with a conveyed object from the carry-in conveyor 2.

The above conveying and sorting apparatus is merely an embodiment of the present invention and should not be limited to the structure and the usage method thereof. For example, when the length of the conveying path of the conveying and sorting apparatus is long and the number of the tilting conveyor units used is increased, the tilting conveyor units can be divided into a plurality of groups and the conveyor driving motor 20 can be provided for each group.

When the conveying and sorting apparatus is formed by a plurality of assemblies 1A to 1E provided with two tilting conveyor units 10, 11, the tilting motors 12, 13 of each assembly 1A to 1E and the columnar support members 14, 15, 17 supporting the bearings 5, 6 at both ends of the support shaft 7 of each assembly 1A to 1E are configured to be installed directly on the common frame 16 in the above embodiment. However, it can also be configured such that an independent frame 16 is provided for each assembly 1A to 1E to complete the assembly 1A to 1E, and the assemblies 1A to 1E are arranged in series to couple the frames 16 to each other and connect the support shafts 7 to each other by the rotation transmitting joints 18, and the conveyor driving motor 20 is interlockingly coupled to the support shaft 7 of the assembly at one end, among the assemblies 1A to 1E.

INDUSTRIAL APPLICABILITY

The conveying and sorting apparatus of the present invention can be utilized as a conveyed object conveying and sorting apparatus such that the conveyed object is loaded and conveyed on a dedicated conveying tray and also required to be sorted automatically according to the destination, as in the luggage conveyance and sorting at airports.

What is claimed is:

1. A conveying and sorting apparatus comprising:
   a plurality of tilting conveyor units arranged in a row in a conveying direction, each of the tilting conveyor units supported so as to be swingable about a support shaft parallel to a conveying direction of a conveyed object between a horizontal conveying orientation and a tilted orientation for discharging the conveyed object laterally with respect to the conveying direction of the conveyed object by gravity, a conveyor driving motor arranged to drive conveying conveyors for the conveyed object provided to each of the tilting conveyor units, and a tilting motor arranged to switch each of the tilting conveyor units between the horizontal conveying orientation and the tilted orientation;
   the support shaft is formed of a single interlocking transmission shaft having a length covering an entire area including the plurality of tilting conveyor units; and
   the conveying conveyors of all of the tilting conveyor units in the area are interlockingly coupled to the interlocking transmission shaft, and the one conveyor driving motor is installed for the area, and the one conveyor driving motor drives the conveying conveyors of all of the tilting conveyor units in the area via the interlocking transmission shaft.

2. The conveying and sorting apparatus according to claim 1, wherein;
   a single drive shaft interlockingly coupled to the conveying conveyors is provided to each of the tilting conveyor units so as to be arranged above the interlocking transmission shaft in an orientation parallel to the conveying direction of the conveyed object, and the single drive shaft and the interlocking transmission shaft are interlockingly coupled by a winding transmission means;
   bearings for supporting the tilting conveyor unit so as to be swingable about the interlocking transmission shaft are attached to each of the tilting conveyor units, and a passive rotating body relatively rotatably fitted to the interlocking transmission shaft at a position adjacent to each bearing is fixed to each bearing; and
   a rotational force of an output shaft of the tilting motor arranged corresponding to each of the tilting conveyor units is transmitted to the tilting conveyor unit via a winding transmission tool stretched between a transmission rotating body attached to the output shaft and the passive rotating body.

3. The conveying and sorting apparatus according to claim 2, wherein;
   the plurality of tilting conveyor units is divided into a plurality of assemblies with two adjacent tilting conveyor units as one assembly, and one support shaft whose both end portions are supported via bearings supports the two tilting conveyor units in each of the assemblies, and the support shafts are interlockingly coupled to each other by a joint between two adjacent assemblies to form the interlocking transmission shaft; and
   the one conveyor driving motor is arranged outside the assembly located at one end, and two of the tilting motors driving the two tilting conveyor units in each of the assemblies are installed such that the transmission rotating bodies are reverse to each other in a front-rear direction at both left and right sides of the interlocking transmission shaft in plan view.

* * * * *